US005784353A

United States Patent [19]
Matsui

[11] Patent Number: 5,784,353
[45] Date of Patent: Jul. 21, 1998

[54] OPTICAL DISK INITIALIZING APPARATUS

[75] Inventor: Tsutomu Matsui, Tokyo, Japan

[73] Assignee: NEC Corporation, Tokyo, Japan

[21] Appl. No.: 813,294

[22] Filed: Mar. 10, 1997

[30] Foreign Application Priority Data

Mar. 15, 1996 [JP] Japan ................... 8-087628

[51] Int. Cl.[6] ........................................ G11B 7/00
[52] U.S. Cl. ............................. 369/102; 369/112
[58] Field of Search ........................ 369/102, 112, 369/110, 44.37, 44.14, 48

[56] References Cited

U.S. PATENT DOCUMENTS

5,513,164  4/1996  Tanaka et al. ................. 369/112

Primary Examiner—Muhammed N. Edun
Attorney, Agent, or Firm—Whitham, Curtis & Whitham

[57] ABSTRACT

An optical disk initializing apparatus includes the first optical system having a gain waveguide laser, a collimator lens, diffraction gratings, and a 45° mirror, the second optical system having a 680-nm red laser, a polarizing beam splitter, a collimator lens, and a λ/4 plate, a dichroic mirror, an objective lens, an optical sensor, a phase compensator, a voltage-current conversion amplifier, and an objective lens actuator. The first optical system outputs a first beam for initialization. The second optical system outputs a second beam having a wavelength different from that of the first beam. The dichroic mirror multiplexes the beam emerging from the first optical system and the second beam emerging from the second optical system. The objective lens focuses an output beam emerging from the dichroic mirror on a phase change recording or magneto-optical recording optical disk. The optical sensor detects a focusing error signal from a return beam of the second beam reflected by the optical disk. The phase compensator, the voltage-current conversion amplifier, and the objective lens actuator focus the objective lens in accordance with the focusing error signal output from the optical sensor.

20 Claims, 7 Drawing Sheets

OPTICAL DISK INITIALIZING APPARATUS

BACKGROUND OF THE INVENTION

The present invention relates to an initializing apparatus for a writable/readable disk, and in particular a phase change recording medium and a magneto-optical recording medium. More specifically, the present invention relates to an apparatus that achieves initialization of a phase change disk by changing phases between a crystalline state and an amorphous state and initialization of a magneto-optical disk by setting the magnetization direction of a perpendicular magnetization film in a predetermined direction.

Studies on an external storage unit for an information processing unit, e.g., a computer, which has both the high-speed accessibility of a magnetic disk and the large capacity memory of an optical disk are under rapid development. It is certain that an optical disk unit will be the next-generation disk unit because it has a high transfer rate, a high random access speed, and a large capacity memory, and because the medium can be stored well and the medium can have good durability due to noncontact access.

Among the conventional recording methods, one using a phase change recording medium, from which a signal is read based on a change in reflectance between the crystalline state and the amorphous state, attracts attention. The drawback of this phase change recording medium is that it cannot achieve a higher consumption ratio than that of a magneto-optical recording medium and that the condition for initialization of the disk before recording is difficult to set. From these reasons, an initializing apparatus useful not only for initialization of a phase change recording medium but also for initialization of a magneto-optical recording medium is sought for.

The condition for initialization is stricter for a phase change recording medium than for a magneto-optical recording medium. Hence, in the following description, attention will be paid to a phase change recording medium, and an initializing apparatus and condition setting for it will be described.

Figure 7A:
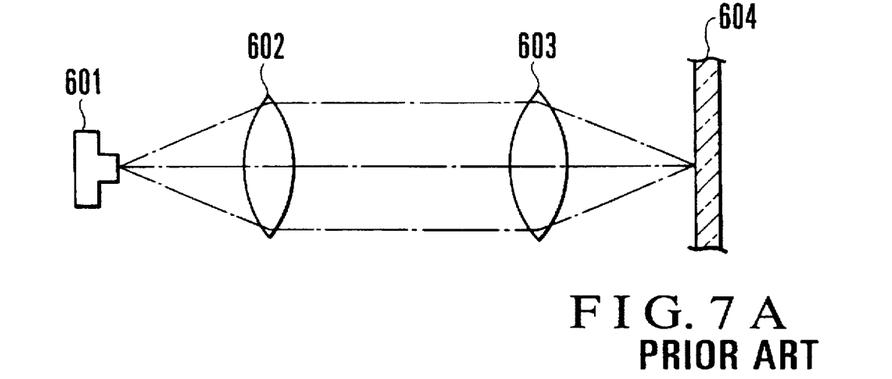
FIG. 7A schematically shows a conventional optical disk initializing apparatus.
Figure 7B:
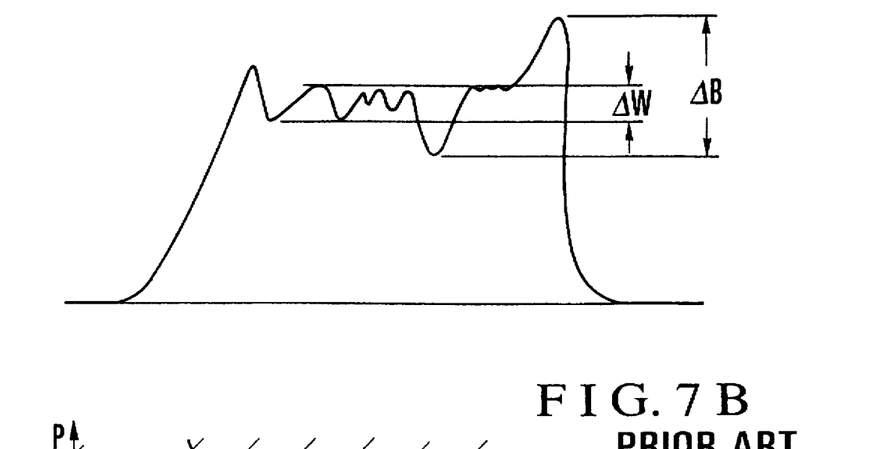
FIG. 7B is a graph showing an example of light quantity distribution of the apparatus shown in FIG. 7A.
Figure 7C:
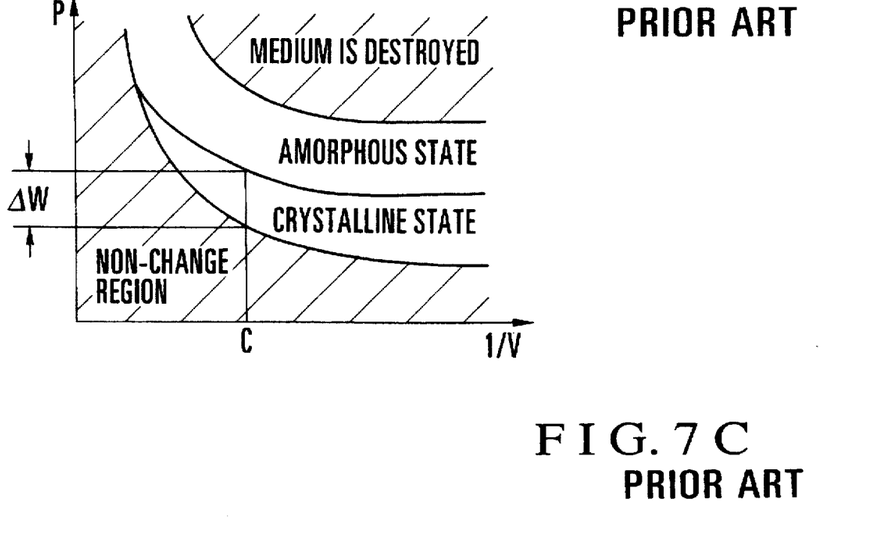
FIG. 7C is a graph showing a phase change state.

FIGS. 7A to 7C show the background of conventional initialization of a phase change disk. As shown in FIG. 7A, a beam emitted from a gain waveguide laser 601 for initialization is collimated into a collimated beam with a collimator lens 602, and this collimated beam is focused on a disk 604 by an objective lens 603.

FIG. 7B shows the distribution of the optical beam intensity of this focused beam on the disk 604 in the radial direction. FIG. 7C shows the phase change of a phase change medium with respect to the distribution of the optical beam intensity (graph of state change). In FIG. 7C, the axis of abscissa represents the reciprocal number (I/V) of the disk linear velocity, and the axis of ordinate represents the laser intensity (P).

As shown in FIG. 7C, when the rotation speed of the disk 604 is high and the disk linear velocity is high (I/V is small), even if the laser intensity (P) is high, a phase change does not occur in the phase change disk. A portion in the graph of FIG. 7C indicating this will be referred to as a "non-change region".

In FIG. 7C, a region where a laser intensity (P) higher than in the non-change region where the disk linear velocity is low is required indicates the crystalline state, and a region where a higher output laser than in the crystalline state is required is an amorphous state. When the disk linear velocity is low and the laser output is large, the medium itself will be destroyed, or a phase change between the crystalline state and the amorphous state disappears.

In the state change graph shown in FIG. 7C, assuming that the reciprocal number (I/V) of the linear velocity on the axis of abscissa is set at a point C, when a width $\Delta W$ (the width of power) of the region of the crystalline state and a variation width $\Delta B$ of the laser intensity distribution of FIG. 7B are compared, $\Delta B > \Delta W$. Since the laser power varies beyond the crystalline region of the medium, a good erase operation cannot be obtained.

The gain waveguide laser 601 is used as the light source, and the shape of the focused beam is elliptic. When considering an afocal optical system (not shown) for the collected beam, if focusing error detection is performed in accordance with an astigmatic method, stable focusing error detection cannot be performed.

As described above, the conventional apparatus has the following problems.

(1) The focusing servo is unstable.
(2) If the optical output of the focused beam is not constant, a crystalline state for initialization cannot be formed stably.
(3) In the case of DC initialization, since the crystal grain becomes large, in the first recording operation, high-quality recording in the repetitive overwrite characteristics is possible. However, regarding the overwrite characteristics in the second and following recording operations, since the contents of the initial recording operation are partly left without being erased, good read characteristics cannot be obtained.

SUMMARY OF THE INVENTION

It is an object of the present invention to provide an optical disk unit which can perform stable focusing servo to form a stable focused beam.

It is another object of the present invention to provide an optical disk unit which reliably obtains the uniformity of the focused beam as the in-focus position of the near-field pattern of a semiconductor laser, thereby achieving stable initialization.

In order to achieve the above objects, according to the present invention, there is provided an optical disk initializing apparatus comprising a first optical system for outputting a first beam for initialization, a second optical system for outputting a second beam having a wavelength different from that of the first beam, multiplexing means for multiplexing the beam emerging from the first optical system and the second beam emerging from the second optical system, an objective lens for focusing an output beam emerging from the multiplexing means on a phase change recording or magneto-optical recording optical disk, detection means for detecting a focusing error signal from a return beam of the second beam reflected by the optical disk, and focusing control means for focusing the objective lens in accordance with the focusing error signal output from the detection means.

DESCRIPTION OF THE PREFERRED EMBODIMENTS

The present invention will be described in detail with reference to the accompanying drawings. First, the outlines of the embodiments of the present invention will be described briefly.

Figure 1:
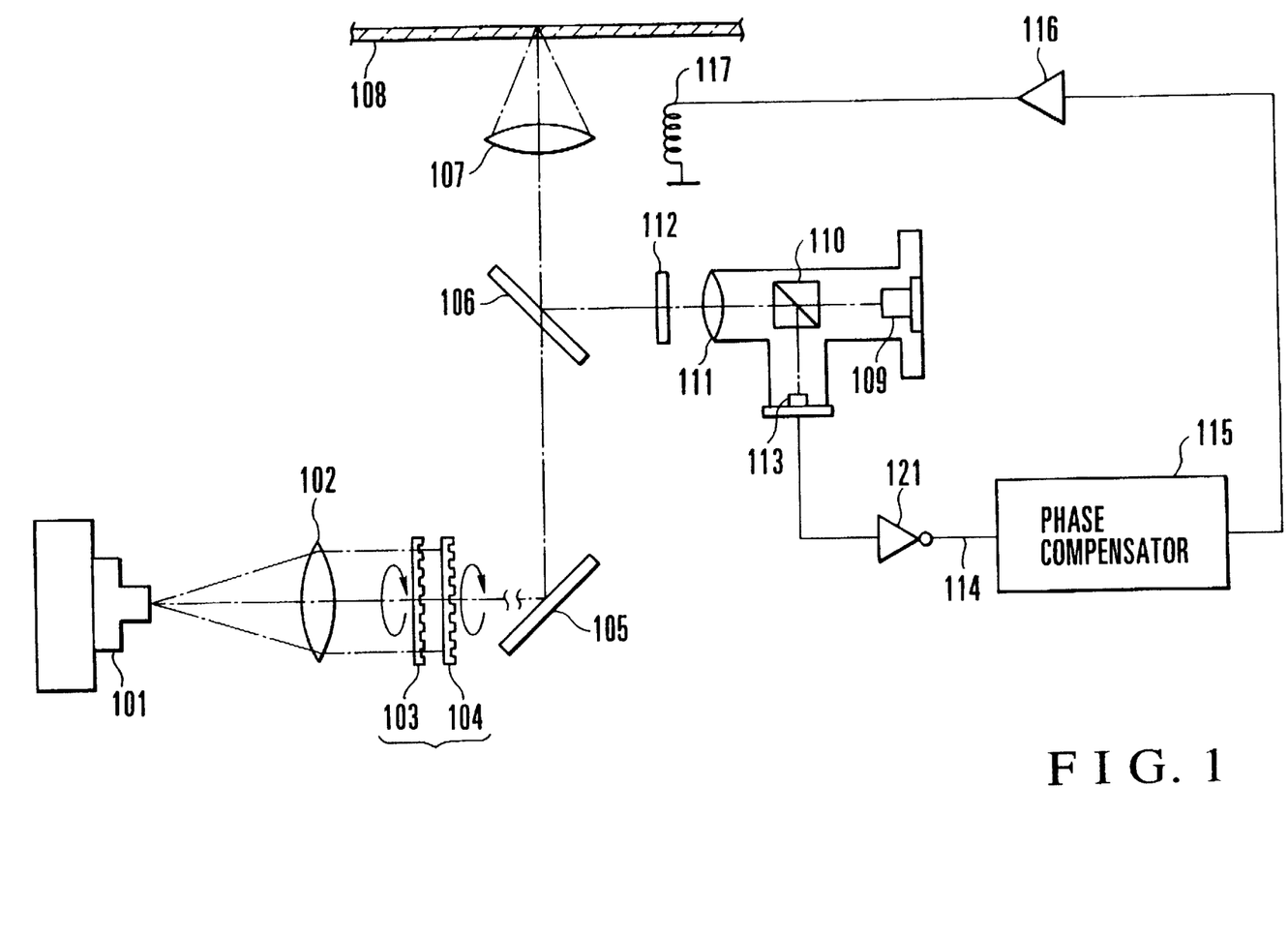
FIG. 1 is a diagram showing the arrangement of an optical disk initializing apparatus according to the first embodiment of the present invention.

In the first embodiment of the present invention, as shown in FIG. 1, an initialization (erasure) beam makes the light quantity distribution of a focused beam flat through one or a plurality of diffraction gratings 103 and 104. The diffraction gratings 103 and 104 are rotatable about their optical axes so that they can be adjusted. The initialization beam is multiplexed with a beam having a wavelength different from the wavelength of the initialization beam by a dichroic mirror 106. A dichroic mirror is also called a two-color filter.

Figure 3A:
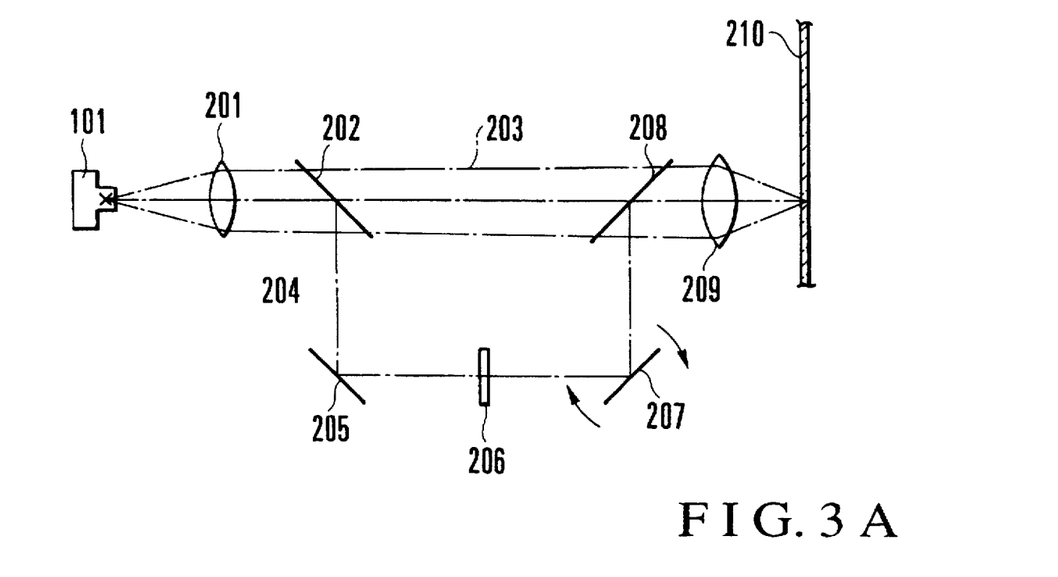
FIG. 3A is a diagram showing the arrangement of an optical disk initializing apparatus according to the second embodiment of the present invention.

In the second embodiment of the present invention, as shown in FIG. 3A, an initialization beam is split into two components by a beam splitter 202, and thereafter one component is polarized, so that the initialization beam is split into a P-polarized wave and an S-polarized wave. The split P- and S-polarized waves are multiplexed again by a beam splitter 208, thereby making the light quantity distribution of the focused beam flat.

Figure 4:
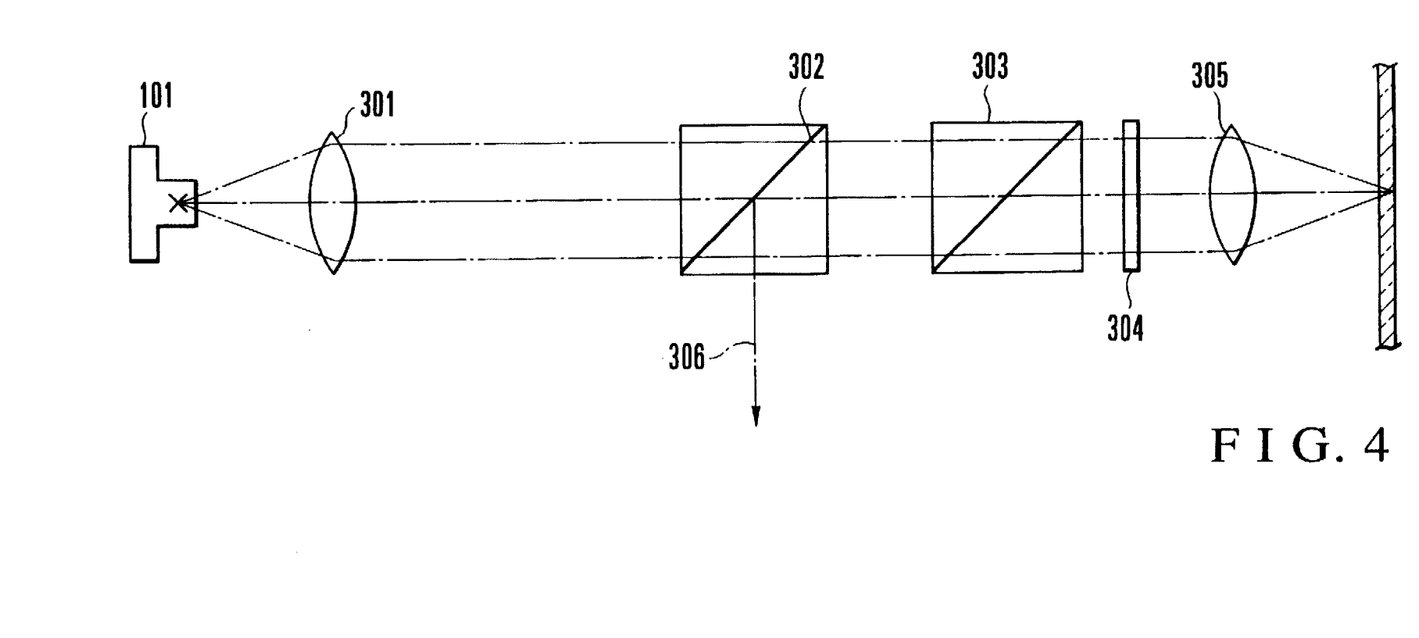
FIG. 4 is a diagram showing the arrangement of an optical disk initializing apparatus according to the third embodiment of the present invention.

In the third embodiment of the present invention, as shown in FIG. 4, a Wollaston polarizing prism 303 is used to change the P- and S-polarized waves to circularly polarized beams. These two beams are arranged in the radial direction of a disk 308, thereby making the light quantity distribution of the focused beam flat.

Figure 5A:
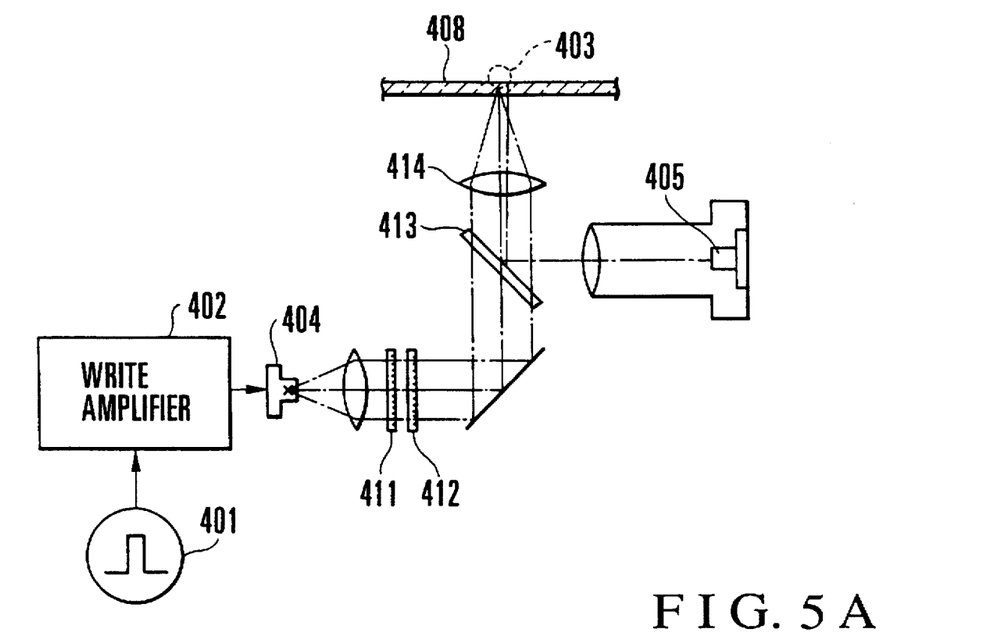
FIG. 5A is a diagram showing the arrangement of an optical disk initializing apparatus according to the fourth embodiment of the present invention.

In the fourth embodiment of the present invention, erasure is performed, in the apparatuses of the first to third embodiments, not with a DC power. Rather, preferably, as shown in FIG. 5A, a laser is pulse-driven to perform switching with, preferably, the maximum repetitive frequency of a recording signal or a frequency twice the maximum repetitive frequency, thereby performing initialization.

Figure 6:
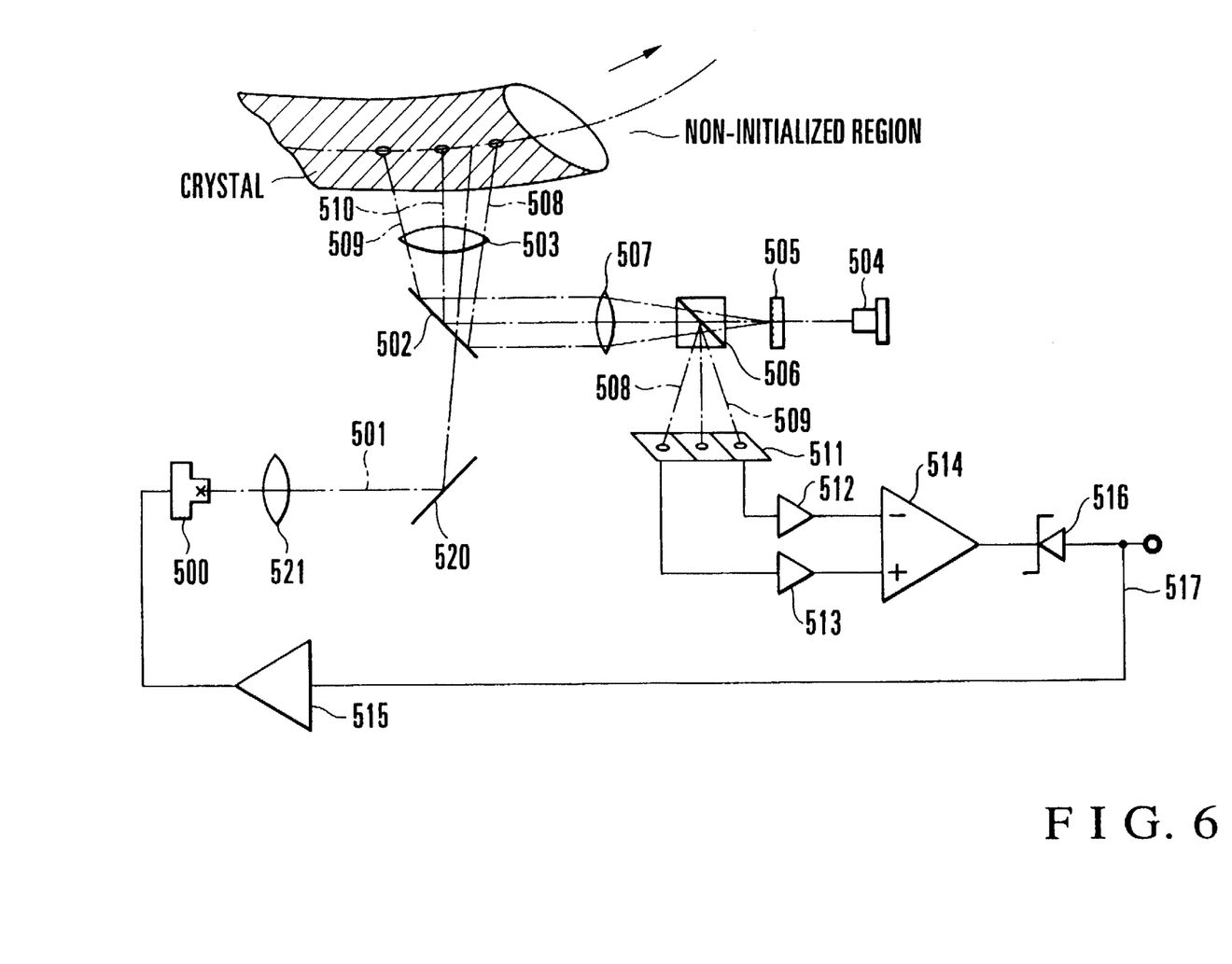
FIG. 6 is a diagram showing the arrangement of an optical disk initializing apparatus, including an arrangement for confirming initialization, according to the fifth embodiment of the present invention.

In the fifth embodiment of the present invention, an optical system having a 3-beam hologram optical head unit to detect a focusing error signal for focusing control is provided in the apparatus of any one of the first to third embodiments, preferably as shown in FIG. 6. The condition for initialization is optimized from an error in reflectance between ±1st-order polarized light components.

According to the present invention, even if the depth of focus is small, a focusing servo operation can be performed stably, and a focused beam output can be uniformed. As a result, stable initialization can be achieved in a magneto-optical disk or a phase change disk.

FIG. 1 shows the optical system of the optical disk initializing apparatus according to the first embodiment of the present invention. A laser beam emitted from a gain waveguide high-output laser and a 680-nm focusing servo laser beam are multiplexed by a dichromic mirror, so that focusing is performed in a stable state. In order to make the light quantity distribution of the focused beam of this gain waveguide laser flat on the disk, the laser beam is split into a plurality of beams by diffraction gratings. The arrangement for splitting the beam into two beams and for multiplexing the beams, and the arrangement for demultiplexing the beam into two beams with the Wollaston prism will be described as the second and third embodiments.

Referring to FIG. 1, a divergent beam emitted from a gain waveguide laser 101 for initialization is collimated into a collimated beam with a collimator lens 102, and the collimated beam passes through the two diffraction gratings 103 and 104. In this case, 3×3=9 beams are obtained with the two diffraction gratings 103 and 104. The beam that has passed through the diffraction gratings 103 and 104 is deflected by 90° with a 45° mirror 105 to travel straight through the dichroic mirror 106. The beam that has traveled straight through the dichroic mirror 106 is focused on an optical disk 108 through an objective lens 107.

A beam emitted from a 680-nm red laser 109 passes through a polarizing beam splitter 110 and is collimated into a collimated beam with a collimator lens 111. The collimated beam emerging from the collimator lens 111 is changed to a circularly polarized beam with a λ/4 plate 112 and is deflected by 90° with the dichroic mirror 106. The beam emerging from the dichroic mirror 106 is multiplexed with an 800-nm red laser beam emitted from the gain waveguide laser 101, and the multiplexed beam is focused on the optical disk 108 through the objective lens 107.

A beam reflected by the optical disk 108 is returned through the objective lens 107, the dichroic mirror 106, the λ/4 plate 112, the collimator lens 111, and the polarizing beam splitter 110 in the reverse direction to that of the exit beam, and is deflected by 90° with the polarizing beam splitter 110. The beam emerging from the polarizing beam splitter 110 becomes incident on an optical sensor 113, and a focusing error signal is detected by the optical sensor 113.

A detection signal from the optical sensor 113 is subjected to current-voltage conversion by a current-voltage conversion amplifier 121, and is output as a focusing error signal 114. The focusing error signal 114 drives an objective lens actuator 117 through a phase compensator 115 and a voltage-current conversion amplifier 116, thereby performing a servo operation (focusing control) in the direction of focus axis.

The function of the two diffraction gratings 103 and 104 will be described with reference to FIGS. 2A and 2B. These diffraction gratings 103 and 104 correct light components of the beam emitted from the gain waveguide laser 101 whose near-field light quantity distribution is not uniform.

Figure 2A:
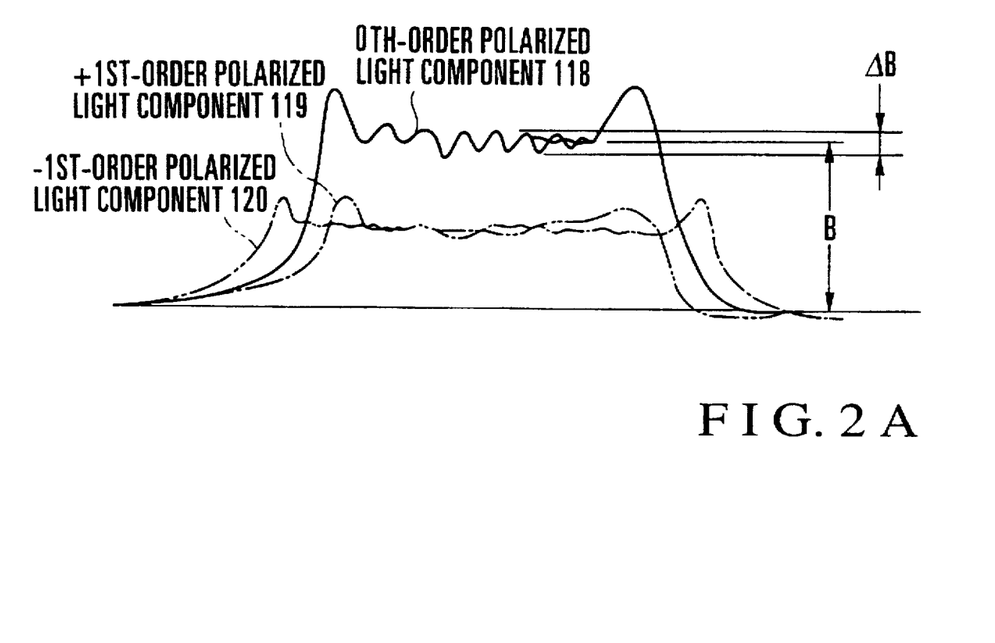
FIGS. 2A and 2B are graphs for explaining the operation of diffraction gratings shown in FIG. 1.

FIG. 2A shows the light intensity distributions of a 0th-order polarized light component 118 and its ±1st-order polarized light components 119 and 120. The axis of abscissa represents the region in the radial direction of the disk, and the axis of ordinate represents the light intensity. The variation of the light intensity distribution of the 0th-order polarized light component 118 is expressed as $\Delta B/B$ where B is the light intensity of the variation center and $\Delta B$ is the variation width.

Figure 2B:
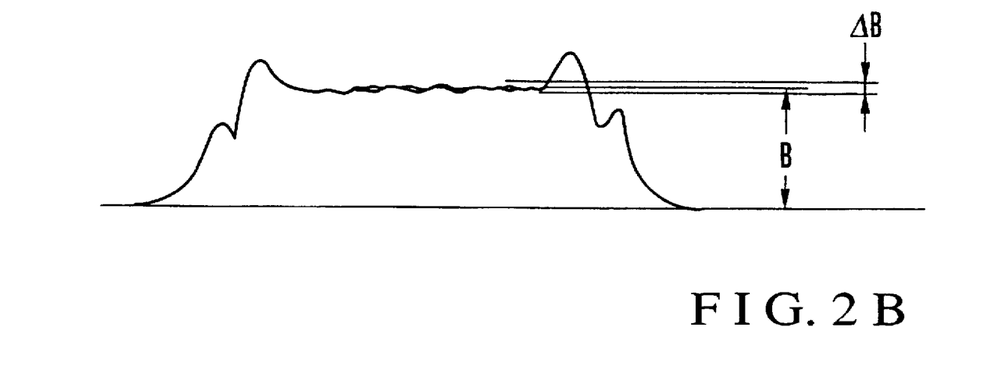

FIG. 2B shows a case wherein the light intensity distribution is decreased by causing the diffraction gratings 103 and 104 to multiplex ±1st-order polarized light components. As shown in FIG. 1, this light intensity distribution can be uniformed by adjusting rotation of the diffraction gratings 103 and 104 as indicated by arrows in FIG. 1. In other words, the variation ΔB/B of the light intensity distribution can be corrected by the diffraction gratings 103 and 104.

FIG. 3A shows the second embodiment of the present invention in which the intensity distribution of the focused beam on the optical disk is uniformed by splitting a beam emitted from the gain waveguide laser into two beams and multiplexing the two beams again.

Figure 3B:
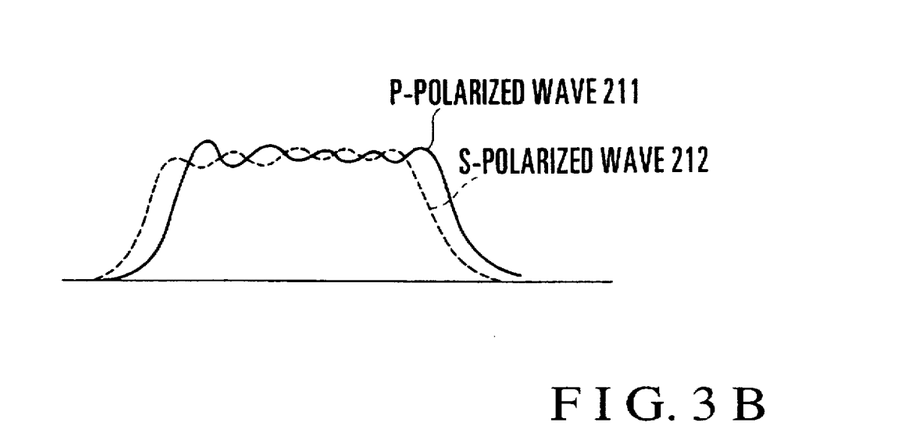
FIG. 3B is a graph for explaining multiplexing of a P-polarized wave and an S-polarized wave.

Referring to FIG. 3A, a beam emitted from a gain waveguide laser 101 is collimated into a collimated beam with a collimator lens 201. The collimated beam is split by the half mirror (beam splitter) 202 into a straight traveling beam (P-polarized wave) 203 and a 90°-deflected beam (P-polarized wave) 204. The 90°-deflected beam 204 is deflected by 90° with a 45° mirror 205, and its plane of deflection is rotated by 90° with a λ/2 plate 206, so that it is polarized from a P-polarized wave to an S-polarized wave. The S-polarized wave emerging from the λ/2 plate 206 is deflected by 90° with a 45° mirror 207, and is multiplexed by the polarizing beam splitter 208 with the straight traveling beam (P-polarized wave) 203 emerging from the half mirror 202. The multiplexed beam obtained by the polarizing beam splitter 208 is focused on an optical disk 210 through an objective lens 209. The beam positions of the two beams incident on the polarizing beam splitter 208 are adjusted by adjusting rotation of the 45° mirror 207. More specifically, as shown in FIG. 3B, a P-polarized wave 211 and an S-polarized wave 212 having beam positions shifted from each other are adjusted and multiplexed.

FIG. 4 shows the third embodiment of the present invention in which the light intensity distribution of the focused beam, which is obtained from two beams, on the optical disk is uniformed by a Wollaston prism.

Referring to FIG. 4, a diffused beam emitted from a gain waveguide laser 101 is collimated into a collimated beam with a collimator lens 301, and the collimated beam is passed through a polarizing beam splitter 302. At this time, the beam is made incident on the Wollaston prism 303 such that the axis of polarization of the gain waveguide laser 101 is inclined by 45° with respect to the crystallographic axis of the Wollaston prism 303, so that the P- and S-polarized waves are output uniformly.

To obtain a focusing error signal by utilizing the return beams of these two beams, a λ/4 plate 304 having a crystallographic axis inclined by 45° with respect to the P- and S-polarized waves is arranged, and the P- and S-polarized waves are changed into circularly polarized beams which are focused on an optical disk 308 through an objective lens 305. A return beam 306 returning from the optical disk 308 is guided to an optical system for detecting a focusing error signal through the path of the objective lens 305, the λ/4 plate 304, the Wollaston prism 303, and the polarizing beam splitter 302.

FIG. 5A shows an arrangement in which a gain waveguide laser is switched with the maximum repetitive frequency of, e.g., a (1,7) RLL (Run Length Limited) recording signal or with a frequency twice this maximum repetitive frequency, so that the crystal grain size is decreased during initialization. The (1,7) RLL method is a recording encoding method for increasing the recording bit density to be higher than the inversion density on the disk. In this method, "0" always comes after "1" but eight or more "0"s do not come consecutively.

For example, to obtain a linear recording density of 0.88511 m/bit at a linear velocity of 12 m/s, a signal is recorded at a recording rate of 86 Mbps (megabit/second). The maximum repetitive frequency of this signal is ⅙ this figure, which is 13.5 MHz. The mark length at this time is 0.335×4/3=0.45 μm. If the maximum repetitive frequency is twice this frequency, recording is performed with a mark length of 0.22 μm.

Figure 5B:
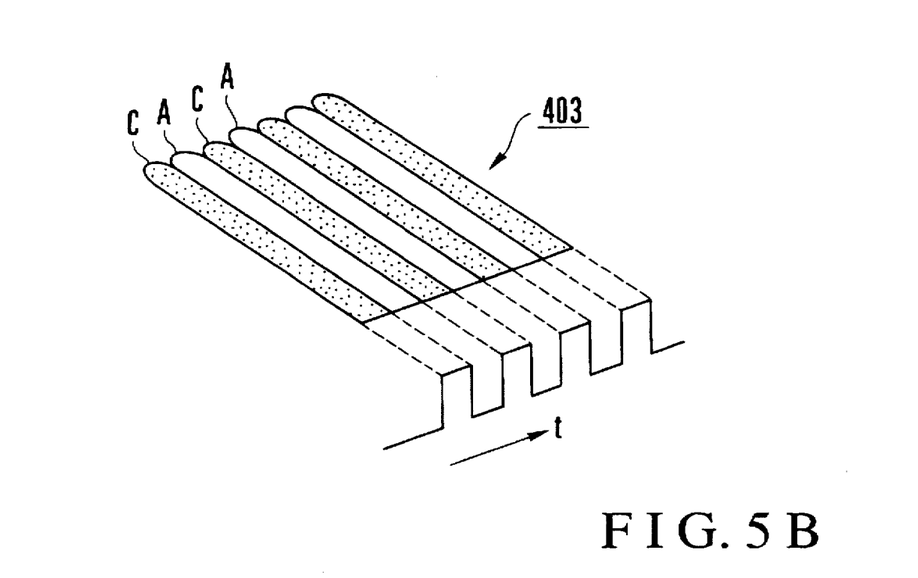
FIG. 5B shows an initialized pattern.

Referring to FIG. 5A, a pulse signal emerging from a pulse generating source 401 is supplied to a laser 404 through a laser drive write amplifier 402 to drive the laser 404. The remaining arrangement is the same as that shown in FIG. 1. Reference numeral 405 denotes a 680-nm red laser; 411 and 412, diffraction gratings; 413, a 45° mirror; and 414, a dichroic mirror. FIG. 5B shows in enlargement formation of a mark 403 on an optical disk 408 when the laser 404 is pulse-driven. Referring to FIG. 5B, reference symbol C denotes a crystalline state; and A, an amorphous state.

FIG. 6 shows an arrangement for discriminating the state of initialization by subtraction of ±1st-order polarized light components with a focusing-servo 3-beam 680-nm laser.

A diffused beam 501 (wavelength λ=800 nm, power P=1,000 mW) emitted from a gain waveguide laser 500 is collimated into a collimated beam with a collimator lens 521, and the collimated beam is deflected by 90° with a 45° mirror 520. The deflected beam emerging from the 45° mirror 520 travels straight through a dichroic mirror 502 and is focused by an objective lens 503. An output beam 504 (power P=5 mW) emitted from a 680-nm laser is converted into three beams by a diffraction grating 505, and the three beams pass through a polarizing beam splitter 506. The three beams that have passed through the polarizing beam splitter 506 are collimated by a collimator lens 507, and the collimated beams are made incident on the dichroic mirror 502 at an angle of 45°.

Of the three beams collected by the objective lens 503, a +1st-order polarized light component 508 lands on a region before an initialization beam, and a −1st-order polarized light component 509 lands on a region after the initialization beam, i.e., on an initialized region. A return beam of a 0th-order polarized light component 510 is guided to an optical system for detecting a focusing error signal.

The ±1st-order polarized light components 508 and 509 are detected by a multi-division optical sensor 511 and are amplified by photoelectric conversion amplifiers 512 and 513, respectively. The two outputs are subjected to subtraction in a subtracter 514 comprising a differential amplifier. A level discriminator 516 outputs an initialization discrimination signal 517 when a difference between the two signals input to the subtracter 514, i.e., the output level from the level discriminator 516, becomes equal to a predetermined level or more, thereby setting a condition for initialization. A laser drive amplifier 515 is gain-controlled by the initialization discrimination signal 517 to adjust an output from the gain waveguide laser 500.

As has been described above, according to the present invention, a magneto-optical disk or a phase change disk can be initialized reliably at a high speed.

What is claimed is:

1. An optical disk initializing apparatus comprising:
   a first optical system having a gain waveguide laser for outputting a first beam for initialization;
   a second optical system for outputting a second beam having a wavelength different from that of the first beam;

a multiplexor for multiplexing the first beam emerging from said first optical system and the second beam emerging from said second optical system;

an objective lens for focusing an output beam emerging from said multiplexor on an optical disk, said optical disk comprising one of a phase change recording optical disk and a magneto-optical recording optical disk;

a detector for detecting a focusing error signal from a return beam of the second beam reflected by said optical disk; and a focusing control unit for focusing said objective lens in accordance with the focusing error signal output from said detector.

2. An apparatus according to claim 1, wherein said first optical system includes a light quantity distribution control unit, arranged on an optical path of the first beam, for making a light quantity distribution of a focused beam uniform on the optical disk.

3. An apparatus according to claim 2, wherein said light quantity distribution control unit includes at least one diffraction grating.

4. An apparatus according to claim 3, wherein said diffraction grating has an optical axis and is rotatable about said optical axis for making the light quantity distribution of the first beam uniform.

5. An apparatus according to claim 2, wherein said light quantity distribution control unit comprises:

an optical branching unit for splitting the first beam into a P-polarized wave and an S-polarized wave;

a second multiplexor for multiplexing the P- and S-polarized waves, and an adjustor for adjusting a beam position of one of the P- and S-polarized waves being supplied to said second multiplexor.

6. An apparatus according to claim 5, wherein said optical branching unit comprises:

a beam splitter for splitting the first beam into two P-polarized waves comprising a straight traveling beam and a reflected wave; and a polarizing plate for polarizing a first P-polarized wave of the two P-polarized waves emerging from said beam splitter to form an S-polarized wave, said second multiplexor multiplexing a second P-polarized wave of the two P-polarized waves emerging from said beam splitter and the S-polarized wave emerging from said polarizing plate.

7. An apparatus according to claim 6, wherein said adjustor comprises a 45° mirror for deflecting the S-polarized wave emerging from said polarizing plate by 90° and causing the S-polarized wave to be incident on said second multiplexor, said 45° mirror being rotated to adjust the beam position of the S-polarized wave.

8. An apparatus according to claim 2, wherein said light quantity distribution control unit comprises a Wollaston prism having a crystallographic axis inclined by 45° with respect to an optical axis of said first optical system, said Wollaston prism demultiplexing a P-polarized wave and an S-polarized wave from the first beam and outputting said P-polarized wave and said S-polarized wave uniformly.

9. An apparatus according to claim 1, further comprising a converter for converting the second beam emerging from said second optical system into three beams comprising a 0th-order polarized light component and ±1st-order polarized light components, the 0th-order polarized light component being focused on an initialized region of said optical disk and the ±1st-order polarized light components landing on portions before and after said initialized region of said optical disk, respectively, an arithmetic operational unit for calculating a difference in reflectance between the ±1st-order polarized light components from a return beam of the second beam returning from said optical disk, and a laser drive control unit for controlling a laser drive system of said first optical system, when the difference in reflectance obtained by said arithmetic operational unit is not less than a predetermined value, thereby initially setting a power of the first beam.

10. An apparatus according to claim 1, further comprising a laser drive unit for pulse-driving said gain waveguide laser.

11. An apparatus according to claim 10, wherein said laser drive unit generates a pulse signal having one of a maximum repetitive frequency of a digital recording signal and a frequency twice the maximum repetitive frequency for pulse-driving said gain waveguide laser.

12. An apparatus according to claim 1, wherein said multiplexor comprises a dichroic mirror arranged at an angle of incidence of 45° with respect to an optical axes of said first and second optical systems, respectively.

13. An apparatus according to claim 1, wherein said second beam is for recording to and reproducing from said optical disk.

14. An apparatus according to claim 1, wherein said gain waveguide laser comprises a 1000 mW laser and said first beam has a 800 nm wavelength.

15. An apparatus according to claim 1, wherein said second beam has a 680 nm wavelength.

16. An apparatus according to claim 1, further comprising a laser drive control unit for controlling said first optical system depending upon a value of said second beam reflected from said optical disk to said detector.

17. An apparatus for initializing, recording on and reproducing from an optical disk comprising:

a first optical system for producing and directing a first light beam toward said optical disk for initializing said optical disk;

a control unit for making said first light beam uniform on said optical disk;

a second optical system for producing and directing a second light beam toward said optical disk for one of recording on and reproducing from said optical disk; and a lens for variably focusing said first light beam and said second light beam on said optical disk.

18. An apparatus as in claim 17, wherein said control unit includes at least one rotatable diffraction grating for making said first beam uniform.

19. An apparatus as in claim 17, wherein said control unit further includes:

a beam splitter for splitting said first beam into at least two polarized beams having different polarizations; and an adjustable multiplexor unit for variably combining said at least two polarized beams.

20. An apparatus as in claim 17, further comprising an optical feedback circuit for variably controlling said lens and for variably controlling a gain of said first optical system.

* * * * *